United States Patent
Szegedy et al.

(10) Patent No.: US 11,462,035 B2
(45) Date of Patent: *Oct. 4, 2022

(54) PROCESSING IMAGES USING DEEP NEURAL NETWORKS

(71) Applicant: Google LLC, Mountain View, CA (US)

(72) Inventors: Christian Szegedy, Mountain View, CA (US); Vincent O. Vanhoucke, San Francisco, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/199,978

(22) Filed: Mar. 12, 2021

(65) Prior Publication Data

US 2021/0201092 A1 Jul. 1, 2021

Related U.S. Application Data

(63) Continuation of application No. 16/846,924, filed on Apr. 13, 2020, now Pat. No. 10,977,529, which is a
(Continued)

(51) Int. Cl.
*G06K 9/46* (2006.01)
*G06V 30/194* (2022.01)
(Continued)

(52) U.S. Cl.
CPC ......... *G06V 30/194* (2022.01); *G06N 3/0454* (2013.01); *G06N 3/063* (2013.01); *G06N 3/084* (2013.01)

(58) Field of Classification Search
CPC . G06T 2207/20081; G06T 2207/20084; G06T 3/4046; G06T 9/002;
(Continued)

(56) References Cited

U.S. PATENT DOCUMENTS

| 5,276,771 A | 1/1994 | Manukian |
| 5,636,326 A | 6/1997 | Stork |

(Continued)

FOREIGN PATENT DOCUMENTS

| CN | 101253493 | 8/2008 |
| CN | 103529439 | 1/2014 |

(Continued)

OTHER PUBLICATIONS

Yi Sun et al., "Deep Convolutional Network Cascade for Facial Point Detection", CVPR2013, pp. 3476-3483. (Year: 2013).*

(Continued)

*Primary Examiner* — Brian Werner
(74) *Attorney, Agent, or Firm* — Fish & Richardson P.C.

(57) ABSTRACT

Methods, systems, and apparatus, including computer programs encoded on computer storage media, for image processing using deep neural networks. One of the methods includes receiving data characterizing an input image; processing the data characterizing the input image using a deep neural network to generate an alternative representation of the input image, wherein the deep neural network comprises a plurality of subnetworks, wherein the subnetworks are arranged in a sequence from lowest to highest, and wherein processing the data characterizing the input image using the deep neural network comprises processing the data through each of the subnetworks in the sequence; and processing the alternative representation of the input image through an output layer to generate an output from the input image.

17 Claims, 3 Drawing Sheets

Related U.S. Application Data continuation of application No. 15/868,587, filed on Jan. 11, 2018, now Pat. No. 10,650,289, which is a continuation of application No. 15/649,947, filed on Jul. 14, 2017, now Pat. No. 9,904,875, which is a continuation of application No. 14/839,452, filed on Aug. 28, 2015, now Pat. No. 9,715,642.

(60) Provisional application No. 62/043,865, filed on Aug. 29, 2014.

(51) Int. Cl.
*G06N 3/063* (2006.01)
*G06N 3/04* (2006.01)
*G06N 3/08* (2006.01)

(58) Field of Classification Search
CPC .......... G06N 3/02–3/105; G06N 3/063; G06N 20/00–20/20; G06V 10/82
See application file for complete search history.

(56) References Cited

U.S. PATENT DOCUMENTS

| | | | |
|---|---|---|---|
| 7,660,774 | B2 | 2/2010 | Mukhetjee et al. |
| 9,508,347 | B2 | 11/2016 | Wang |
| 9,530,047 | B1 | 12/2016 | Tang et al. |
| 9,715,642 | B2 | 7/2017 | Szegedy et al. |
| 10,460,211 | B2 | 10/2019 | Vanhoucke et al. |
| 2008/0172349 | A1 | 7/2008 | Prokhorov |
| 2013/0110752 | A1 | 5/2013 | Robinson et al. |
| 2015/0161522 | A1 | 6/2015 | Saon |
| 2016/0063359 | A1 | 3/2016 | Szegedy et al. |
| 2017/0004399 | A1 | 1/2017 | Kasahara |
| 2017/0185895 | A1 | 6/2017 | Chen |
| 2017/0243085 | A1 | 8/2017 | Vanhoucke et al. |
| 2017/0263240 | A1 | 9/2017 | Kalinli-Akbacak |
| 2017/0316286 | A1 | 11/2017 | Szegedy et al. |

FOREIGN PATENT DOCUMENTS

| | | |
|---|---|---|
| CN | 103544705 | 1/2014 |
| CN | 103824055 | 5/2014 |
| CN | 105849747 | 8/2016 |
| JP | 2002091505 | 3/2002 |
| JP | 2006285899 | 10/2006 |
| WO | WO 9313487 | 7/1993 |

OTHER PUBLICATIONS

CN Office Action in Chinese Application No. 201910116683, dated Jan. 16, 2020, 11 pages (with English translation).
EP Office Action in European Application No. 15762879, dated Oct. 2, 2019, 7 pages.
EP Summons to attend oral proceedings pursuant to Rule 115(1) EPC in European Appln. No. 15762879.3, dated May 14, 2020, 14 pages.
Girshick et al., "Rich feature hierarchies for accurate object detection and semantic segmentation," tech report, arXiv:1311.2524v5 [cs.CV], Oct. 2014, pp. 1-21.
International Search Report and Written Opinion in International Application No. PCT/US2015/047502, dated Dec. 4, 2015, 12 pages.
Iwaniak et al. "Using neural networks for urban area classification in satellite images," Remote Sensing in Transition, Goossens (ed.) Copyright 2004 Millpress, Rotterdam, ISBN 90 5966 007 2, 6 pages.
Ji et al. "3D Convolutional Neural Networks for Human Action Recogmtion," IEEE Transactions on Pattern Analysis and Machine Intelligence, vol. 35, No. 1, Jan. 2013, 14 [ages.
Krizhevsky et al., "ImageNet classification with deep convolutional neural networks," Advances in neural information processing systems25, 2012, pp. 1-9.
Lin et al., "Network in Network," arXiv: 1312.4400v3 [cs.NE], Mar. 2014, pp. 1-10.
Office Action issued in Chinese Application No. 201580035806.7, dated May 31, 2018, 16 pages (with English translation).
Redmon et al., "You Only Look Once: Unified, Real-Time Object Detection," retrieved from URL <https://pjreddie.com/media/files/papers/yolo.pdf>. Jun. 2016, 10 pages.
Szegedy et al., "Going Deeper with Convolutions," arXiv: 1409.4842v1 [cs.CV], Sep. 2014, pp. 1-12.
Szegedy et al., "Sacalable High Quality Object Detection," arXiv: 1412.1441v3 [cs.CV] Dec. 9, 2015, 10 pages.
Xie et al., "Aggregated Residual Transformations for Deep Neural Networks," https://arxiv.org/abs/1611.05431v2, last revised Apr. 2017, 10 pages.

* cited by examiner

PROCESSING IMAGES USING DEEP NEURAL NETWORKS

CROSS-REFERENCE TO RELATED APPLICATION

This application is a continuation of U.S. application Ser. No. 16/846,924, filed on Apr. 13, 2020, which application is a continuation of U.S. application Ser. No. 15/868,587, filed on Jan. 11, 2018, now U.S. Pat. No. 10,650,289, which application is a continuation of U.S. application Ser. No. 15/649,947, filed on Jul. 14, 2017, now U.S. Pat. No. 9,904,875, which is a continuation of U.S. application Ser. No. 14/839,452, filed on Aug. 28, 2015, now U.S. Pat. No. 9,715,642, which claims the benefit under 35 U.S.C. § 119(e) of priority to U.S. Provisional Application No. 62/043,865, filed on Aug. 29, 2014. The disclosure of the prior applications are considered part of and are incorporated by reference in the disclosure of this application.

BACKGROUND

This specification relates to processing images using deep neural networks, e.g., convolutional neural networks.

Convolutional neural networks generally include two kinds of neural network layers, convolutional neural network layers and fully-connected neural network layers. Convolutional neural network layers have sparse connectivity, with each node in a convolutional layer receiving input from only a subset of the nodes in the next lowest neural network layer. Some convolutional neural network layers have nodes that share weights with other nodes in the layer. Nodes in fully-connected layers, however, receive input from each node in the next lowest neural network layer.

SUMMARY

In general, this specification describes techniques for processing images using deep neural networks.

Particular embodiments of the subject matter described in this specification can be implemented so as to realize one or more of the following advantages. By including subnetworks and, in particular, module subnetworks, in a deep neural network, the deep neural network can perform better on image processing tasks, e.g., object recognition or image classification. Additionally, deep neural networks that include module subnetworks can be trained quicker and more efficiently than deep neural networks that do not include module subnetworks while maintaining improved performance on the image processing tasks.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
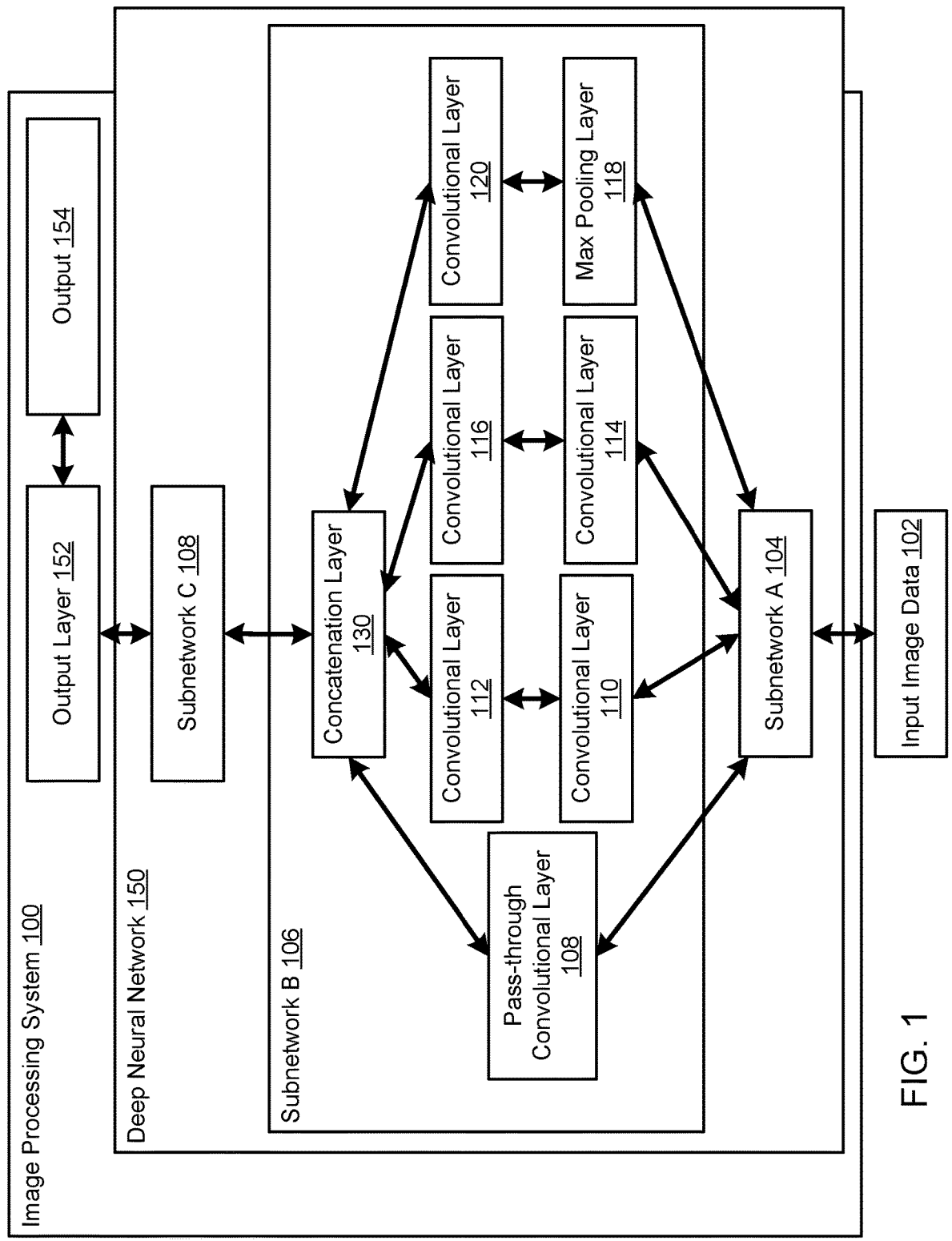
FIG. 1 shows an example image processing system.

FIG. 1 shows an example image processing system 100. The image processing system 100 is an example of a system implemented as computer programs on one or more computers in one or more locations, in which the systems, components, and techniques described below can be implemented.

The image processing system 100 receives data characterizing an input image, e.g., pixel information for the input image or other information characterizing the input image. For example, the image processing system 100 can receive input image data 102. The image processing system 100 processes the received data using a deep neural network 150 and an output layer 152 to generate an output for the input image, e.g., an output 154 from the input image data 102.

The image processing system 100 can be configured to receive input image data and to generate any kind of score or classification output based on the input image, i.e., can be configured to perform any kind of image processing task. The score or classification output generated by the system depends on the task that the image processing system has been configured to confirm. For example, for an image classification or recognition task, the output generated by the image processing system 100 for a given image may be scores for each of a set of object categories, with each score representing the likelihood that the image contains an image of an object belonging to the category. As another example, for an object detection task, the output generated by the image processing system 100 can identify a location, a size, or both, of an object of interest in the input image.

The deep neural network 150 includes a sequence of multiple subnetworks arranged from a lowest subnetwork in the sequence to a highest subnetwork in the sequence, e.g., the sequence that includes subnetwork A 104, subnetwork B 106, and subnetwork C 108. The deep neural network 150 processes received input image data through each of the subnetworks in the sequence to generate an alternative representation of the input image. Once the deep neural network 150 has generated the alternative representation of the input image, the output layer 152 processes the alternative representation to generate an output for the input image. As described above, the type of output generated by the output layer 152 depends on the image classification task the image process system 100 has been configured to confirm. Similarly, the type of output layer 152 used to generate the output from the alternative representation also depends on the task. In particular, the output layer 152 is an output layer that is appropriate for the task, i.e., that generates the kind of output that is necessary for the image processing task. For example, for the image classification task, the output layer may be a softmax output layer that generates the respective score for each of the set of object categories.

The subnetworks in the sequence include multiple module subnetworks and, optionally, one or more other subnetworks that each consist of one or more conventional neural network layers, e.g., max-pooling layers, convolutional layers, fully-connected layers, regularization layers, and so on.

In the example of FIG. 1, subnetwork B 106 is depicted as a module subnetwork. While only a single module subnetwork is shown in the example of FIG. 1, the deep neural network 150 will generally include multiple module subnetworks. A module subnetwork generally includes a pass-through convolutional layer, e.g., the pass-through convolutional layer 106, one or more groups of neural network layers, and a concatenation layer, e.g., concatenation layer 130. The module subnetwork B 106 receives an input from a preceding subnetwork in the sequence and generates an output representation from the received input.

The concatenation layer 130 receives an output generated by the pass-through convolutional layer 108 and a respective output generated by each of the groups of neural network layers and concatenates the received outputs to generate a single output that is provided as the output of the subnetwork B 106 to the next module in the sequence of modules or to the output layer 152.

Each group of neural network layers in a module subnetwork includes two or more neural network layers, with an initial neural network layer followed by one or more other neural network layers. For example, the subnetwork B 106 includes one group that includes a first convolutional layer 110 followed by a second convolutional layer 112, another group that includes a convolutional layer 114 followed by a convolutional layer 116, and a third group that includes a max pooling layer 118 followed by a convolutional layer 120.

Generally, each node in a fully-connected layer receives an input from each node in the next lowest layer in the sequence and produces an activation from the received inputs in accordance with a set of weights for the node. The activations generated by each node in a given fully-connected layer are provided as an input to each node in the next highest fully-connected layer in the sequence or, if the fully-connected layer is the highest layer in the sequence, provided to the output layer 152.

Unlike fully-connected layers, convolutional layers are generally sparsely-connected neural network layers. That is, each node in a convolutional layer receives an input from a portion of, i.e., less than all of, the nodes in the preceding neural network layer or, if the convolutional layer is the lowest layer in the sequence, a portion of an input to the image processing system 100, and produces an activation from the input. Generally, convolutional layers have nodes that produce an activation by convolving received inputs in accordance with a set of weights for each node. In some cases, nodes in a convolutional layer may be configured to share weights. That is, a portion of the nodes in the layer may be constrained to always have the same weight values as the other nodes in the layer.

Processing an input using a module subnetwork to generate an output representation is described in more detail below with reference to FIG. 3.

Figure 2:
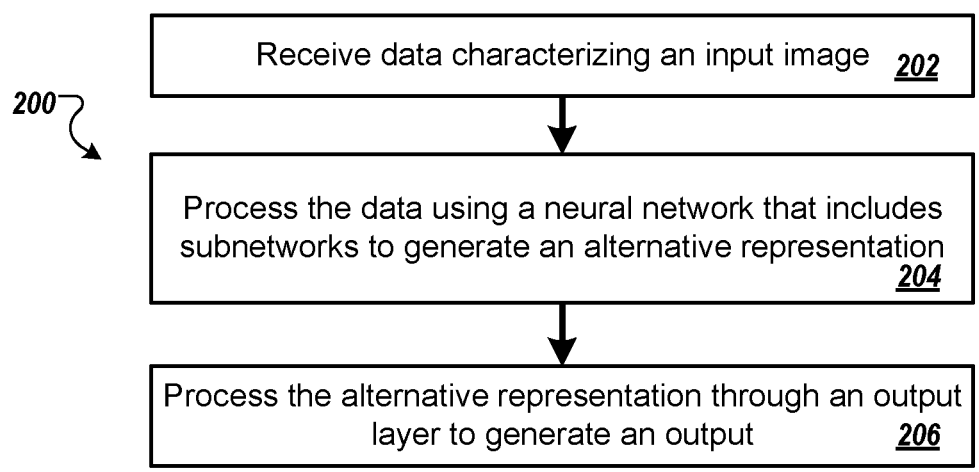
FIG. 2 is a flow diagram of an example process for generating an output from an input image.

FIG. 2 is a flow diagram of an example process 200 for generating an output from a received input. For convenience, the process 200 will be described as being performed by a system of one or more computers located in one or more locations. For example, an image processing system, e.g., the image processing system 100 of FIG. 1, appropriately programmed in accordance with this specification, can perform the process 200.

The system receives data characterizing an input image (step 202).

The system processes the data using a deep neural network that includes subnetworks, e.g., the deep neural network 150 of FIG. 1, to generate an alternative representation (step 204). The deep neural network includes a sequence of subnetworks arranged from a lowest subnetwork in the sequence to a highest subnetwork in the sequence. The system processes the data through each of the subnetworks in the sequence to generate the alternative representation. The subnetworks in the sequence include multiple module subnetworks and, optionally, one or more subnetworks that include one or more conventional neural network layers, e.g., max-pooling layers, convolutional layers, fully-connected layers, regularization layers, and so on. Processing an input through a module subnetwork is described below with reference to FIG. 3.

The system processes the alternative representation through an output layer to generate an output for the input image (step 206). Generally, the output generated by the system depends on the image processing task that the system has been configured to perform. For example, if the system is configured to perform an image classification or recognition task, the output generated by the output layer may be a respective score for each of a predetermined set of object categories, with the score for a given object category representing the likelihood that the input image contains an image of an object that belongs to the object category.

Figure 3:
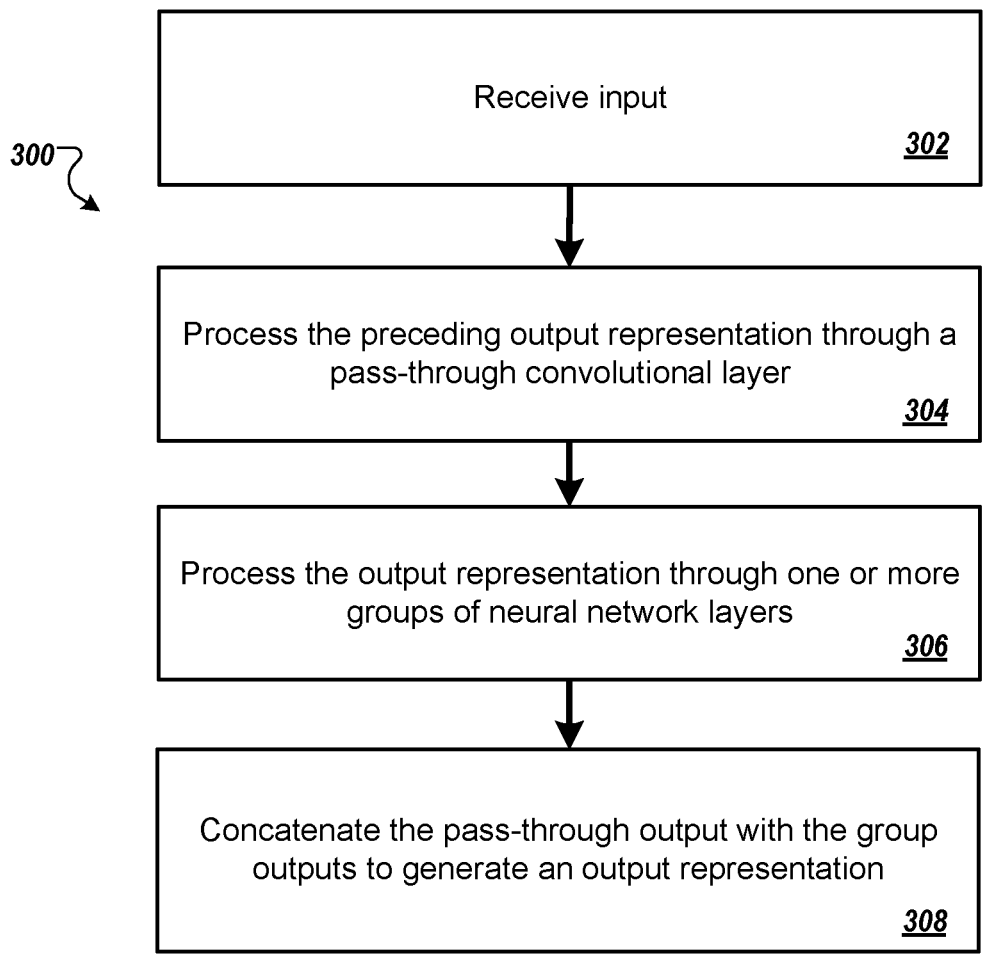
FIG. 3 is a flow diagram of an example process for processing an input using a module subnetwork.

FIG. 3 is a flow diagram of an example process 300 for processing an input using a module subnetwork. For convenience, the process 300 will be described as being performed by a system of one or more computers located in one or more locations. For example, an image processing system, e.g., the image processing system 100 of FIG. 1, appropriately programmed in accordance with this specification, can perform the process 300.

The system receives an input (step 302). In particular, the input is a preceding output representation, i.e., an output representation generated by a preceding subnetwork in the sequence of subnetworks.

The system processes the preceding output representation through a pass-through convolutional layer to generate a pass-through output (step 304). In some implementations, the pass-through convolutional layer is a 1×1 convolutional layer. Generally, a k×k convolutional layer is a convolutional layer that uses a k×k filter. That is, k×k represents the size of the patch in the preceding layer that the convolutional layer is connected to. In these implementations, the 1×1 pass-through convolutional layer is generally used as a dimension reduction module to reduce the dimension of the preceding output representation and remove computational bottlenecks that may otherwise limit the size of the deep neural network. In other implementations, the pass-through convolutional layers can use different sized filters, e.g., a 3×3 convolutional layer or a 5×5 convolutional layer.

The system processes the preceding output representation through one or more groups of neural network layers (step 306). Each group of neural network layers includes an initial neural network layer followed by one or more additional neural network layers. The system processes the preceding output representation through a given group by processing the preceding output representation through each of the neural network layers in the group to generate a group output for the group.

In some implementations, one or more of the groups includes one convolutional layer followed by another convolutional layer. For example, one group may include a 1×1 convolutional layer followed by a 3×3 convolutional layer. As another example, another group may include a 1×1 convolutional layer followed by a 5×5 convolutional layer. As described above, the 1×1 convolutional layers can be used as a dimension reduction module to reduce the dimension of the preceding output representation before it is processed by the other convolutional layer that follows the 1×1 convolutional layer. Other combinations of convolutional layer sizes are possible, however.

In some implementations, one or more of the groups includes a max-pooling layer followed by a convolutional layer. For example, the max-pooling layer may be a 3×3 max-pooling layer followed by a 1×1 convolutional layer. Other combinations of max-pooling layer sizes and convolutional layer sizes are possible, however.

The system concatenates the pass-through output with the group outputs to generate an output representation (step 308). For example, the system can concatenate vectors generated by the pass-through convolutional layer and the groups to generate a single vector, i.e., the output representation. The system can then provide the output representation as an input to the next subnetwork in the sequence or to the output layer of the system.

The processes 200 and 300 can be performed to generate classification data for images for which the desired classification, i.e., the output that should be generated by the system for the image, is not known. The processes 200 and 300 can also be performed on documents in a set of training images, i.e., a set of images for which the output that should be predicted by the system is known, in order to train the deep neural network, i.e., to determine trained values for the parameters of the layers in the deep neural network, i.e., of the layers in the module subnetworks and the other subnetworks. In particular, the processes 200 and 300 can be performed repeatedly on images selected from a set of training images as part of a backpropagation training technique that determines trained values for the parameters of the layers of the deep neural network.

In some implementations, during training, the deep neural network is augmented with one or more other training subnetworks that are removed after the deep neural network has been trained. Each other training subnetwork (also referred to as a "side tower") includes one or more conventional neural network layers, e.g., can include one or more of average pooling layers, fully connected layers, dropout layers, and so on, and an output layer that is configured to generate the same classifications as the output layer of the system. Each other training subnetwork is configured to receive the output generated by one of the subnetworks of the deep neural network, i.e., in parallel with the subnetwork that already receives the subnetwork output, and process the subnetwork output to generate a training subnetwork output for the training image. The training subnetwork output is also used to adjust values for the parameters of the layers in the deep neural network as part of the backpropagation training technique. As described above, once the deep neural network has been trained, the training subnetworks are removed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising one or more computers and one or more storage devices storing instructions that, when executed by the one or more computers, cause the one or more computers to implement:
    a neural network configured to process data characterizing an input image to generate an alternative representation of the input image, the neural network comprising:
        a plurality of subnetworks arranged in a sequence from lowest to highest, the plurality of subnetworks configured to process the data according to the sequence, the plurality of subnetworks comprising a plurality of module subnetworks, each of the module subnetworks comprising:
            a plurality of groups of neural network layers configured to process a preceding output representation generated by a preceding subnetwork in the sequence and to generate a respective group output for each of the plurality of groups, wherein each group of the plurality of groups includes at least two successive convolutional layers, wherein the at least two successive convolutional layers comprises a 1×1 convolution layer followed by a N×N convolutional layer, wherein N is an integer greater than 1; and
        an output layer configured to process the alternative representation of the input image to generate an output from the input image.

2. The system of claim 1, wherein the at least two successive convolutional layers comprises a 1×1 convolution layer followed by a 3×3 convolutional layer.

3. The system of claim 2, where each of the module subnetworks comprises a concatenation layer, the concatenation layer configured to concatenate the group outputs.

4. The system of claim 1, wherein the plurality of subnetworks further comprises an additional subnetwork, wherein the additional subnetwork comprises a pooling layer.

5. The system of claim 4, wherein the additional subnetwork comprises a fully-connected layer.

6. The system of claim 1, wherein the output layer is a softmax output layer.

7. The system of claim 1, wherein the plurality of subnetworks comprises one or more initial convolutional layers.

8. The system of claim 1, wherein the output is an image classification of the input image.

9. The system of claim 1, wherein the output includes data for one or more objects detected in the input image, including a location of the one or more objects in the input image or a size of the one or more objects in the input image.

10. A system comprising one or more computers and one or more storage devices storing instructions that, when executed by the one or more computers, cause the one or more computers to implement:
    a neural network configured to process data characterizing an input image to generate an alternative representation of the input image, the neural network comprising:
        a plurality of subnetworks arranged in a sequence from lowest to highest, the plurality of subnetworks configured to process the data according to the sequence, the plurality of subnetworks comprising at least a first subset of subnetworks and a second subset of subnetworks;

the first subset of subnetworks comprising a respective plurality of groups of neural network layers configured to process a preceding output representation generated by a preceding subnetwork in the sequence and to generate a respective group output for each of the plurality of groups, wherein each group of the plurality of groups includes at least three successive convolutional layers, and the at least three successive convolutional layers comprises a 1×1 convolution layer followed by a N×N convolutional layer, wherein N is an integer greater than 1;

the second subset of subnetworks follows the first subset of subnetworks, wherein each subnetwork in the second subset comprises a fully-connected layer; and an output layer configured to process the alternative representation of the input image to generate an output from the input image.

11. The system of claim 10, wherein the at least three successive convolutional layers comprises a 1×1 convolution layer followed by a 3×3 convolutional layer.

12. The system of claim 10, wherein the plurality of subnetworks comprises a third subset of subnetworks, wherein each subnetwork in the third subset comprises one or more convolutional layers.

13. The system of claim 12, wherein each subnetwork in the third subset comprises a max-pooling layer.

14. The system of claim 13, wherein the max-pooling layer is an M×M max-pooling layer, where M is an integer greater than 1.

15. The system of claim 10, wherein the output includes data for one or more objects detected in the input image.

16. The system of claim 15, wherein the data for the one or more objects includes a location of the one or more objects in the input image or a size of the one or more objects in the input image.

17. The system of claim 10, wherein the output is an image classification of the input image.

* * * * *